(12) United States Patent
Kajiyama et al.

(10) Patent No.: US 11,750,080 B2
(45) Date of Patent: Sep. 5, 2023

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Kazuyori Tahata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 226 days.

(21) Appl. No.: 17/292,905

(22) PCT Filed: Dec. 25, 2018

(86) PCT No.: PCT/JP2018/047458
§ 371 (c)(1),
(2) Date: May 11, 2021

(87) PCT Pub. No.: WO2020/136699
PCT Pub. Date: Jul. 2, 2020

(65) Prior Publication Data
US 2022/0029524 A1    Jan. 27, 2022

(51) Int. Cl.
*H02M 1/12* (2006.01)
*H02M 1/32* (2007.01)
(Continued)

(52) U.S. Cl.
CPC ............... *H02M 1/12* (2013.01); *H02M 1/32* (2013.01); *H02M 7/49* (2013.01); *H02M 7/5387* (2013.01)

(58) Field of Classification Search
CPC ............ H02M 1/12; H02M 1/32; H02M 7/49; H02M 7/5387
See application file for complete search history.

(56) References Cited

U.S. PATENT DOCUMENTS 9,559,541 B2 *  1/2017  Cheng ................... H02M 1/36
9,819,188 B1    11/2017 Pan et al.
(Continued)

FOREIGN PATENT DOCUMENTS

EP    2978092 A1    1/2016
EP    3220529 A1    9/2017
(Continued)

OTHER PUBLICATIONS

Extended European Search Report dated Nov. 17, 2021, issued in corresponding European Application No. 18944369.0. (10 pages).
(Continued)

*Primary Examiner* — Rafael O De Leon Domenech
(74) *Attorney, Agent, or Firm* — BUCHANAN INGERSOLL & ROONEY PC

(57) ABSTRACT

A power converter includes an arm in which a plurality of converter cells are connected in series, each of the converter cells including at least two switching elements, a power storage element, and a pair of output terminals. A control device controls the power converter. The converter cell includes a switch to have the converter cell bypassed. When the control device senses failure of the converter cell, it has the failed converter cell within the arm bypassed and controls a normal converter cell within the arm to suppress a ratio of a harmonic component in an arm current that increases due to the failure.

9 Claims, 16 Drawing Sheets

(51) Int. Cl.
*H02M 7/49* (2007.01)
*H02M 7/5387* (2007.01)

(56) References Cited

U.S. PATENT DOCUMENTS

| | | | | |
|---|---|---|---|---|
| 2016/0118908 | A1* | 4/2016 | Bhalodi | H02M 7/4835 363/89 |
| 2017/0163170 | A1* | 6/2017 | Tahata | H02M 7/483 |
| 2017/0288569 | A1* | 10/2017 | Uda | H02M 1/32 |
| 2017/0310237 | A1* | 10/2017 | Uda | H02H 7/1257 |
| 2018/0302003 | A1* | 10/2018 | Mori | H02M 7/1623 |

FOREIGN PATENT DOCUMENTS

| | | | |
|---|---|---|---|
| JP | 2016214009 A | 12/2016 | |
| JP | 2016214083 A | 12/2016 | |
| JP | 2017017942 A | 1/2017 | |
| JP | 2017143619 A | 8/2017 | |

OTHER PUBLICATIONS

Kim et al., "Operating Region of Modular Multilevel Converter for HVDC With Controlled Second-Order Harmonic Circulating Current: Elaborating P-Q Capability", IEEE Transactions on Power Delivery, vol. 31, No. 2, Apr. 2016, pp. 493-502, XP011604141.

International Search Report (PCT/ISA/210) and Written Opinion (PCT/ISA/237) dated Feb. 5, 2019, by the Japan Patent Office as the International Searching Authority for International Application No. PCT/JP2018/047458.

Communication from the Examining Division issued in EP Application No. 18944369; dated Jun. 6, 2023; 7 pages.

* cited by examiner (a)　　　　　　　　　(b)

POWER CONVERSION DEVICE

TECHNICAL FIELD

The present invention relates to a power conversion device.

BACKGROUND ART

A modular multilevel converter (which will be referred to as an MMC converter below) in which a plurality of unit converters (which will be referred to as converter cells below) are cascaded can readily address a high voltage by increasing converter cells. The modular multilevel converter has widely been applied to power transmission and distribution systems as a high-capacity static var compensator or an alternating-current (AC)-direct-current (DC) power conversion device for high-voltage DC power transmission. The converter cell includes a plurality of switching elements and a power storage element (which may be referred to as a capacitor). Even when a converter cell fails in the MMC converter, the MMC converter can continue operating by bypassing the failed converter cell.

PTL 1 describes an operation method without requiring adjustment of a modulation factor of each arm by adjusting the number of operating converter cells in each arm in accordance with the number of failures in an arm largest in number of failed converter cells and increasing a capacitor voltage.

CITATION LIST

Patent Literature

PTL 1: Japanese Patent Laying-Open No. 2017-143619

SUMMARY OF INVENTION

Technical Problem

PTL 1, however, does not consider a harmonic component in an arm current that increases after bypass of the failed converter cell.

An output voltage from a converter cell in the MMC converter contains a harmonic component such as a switching frequency component, an integer-order component thereof, and a sideband wave component thereof (which will simply be referred to as a harmonic component below), in addition to a frequency component included in an arm voltage command value such as a fundamental wave component on an AC output side (simply a fundamental wave component below) and a DC component. The MMC converter adopting phase shift pulse width modulation (PWM) cancels a harmonic component in an output voltage from each converter cell by equally shifting a PWM reference phase for each converter cell in each arm. A switching frequency of the output voltage from the arm can thus be made higher.

When a converter cell fails and the failed converter cell is bypassed, however, an output voltage from the failed converter cell becomes zero. Since an amount of shift of the PWM reference phase is thus no longer equal, the harmonic component in the output voltage from each converter cell cannot be canceled. Consequently, the harmonic component in the output voltage from each converter cell remains in the output voltage from the arm. Energy of the harmonic component is thus concentrated in some converter cells. Consequently, capacitor voltages of some converter cells deviate from a protection level and the MMC converter may stop operating for a protection purpose.

Therefore, an object of the present invention is to provide a power conversion device capable of suppressing a harmonic component in an output voltage from an arm that increases after bypass of a failed converter cell.

Solution to Problem

A power conversion device according to the present invention includes a power converter including an arm in which a plurality of converter cells are connected in series, each of the plurality of converter cells including at least two switching elements, a power storage element, and a pair of output terminals, and a control device to control the power converter. The converter cell includes a switch to have the converter cell bypassed. When the control device senses failure of a converter cell, the control device has a failed converter cell within the arm bypassed and controls a normal converter cell within the arm to suppress a ratio of a harmonic component in an arm current that increases due to the failure.

Advantageous Effects of Invention

According to the present invention, a harmonic component in an arm current that increases after bypass of a failed converter cell can be suppressed.

DESCRIPTION OF EMBODIMENTS

Embodiments will be described below with reference to the drawings.

First Embodiment (Overall Configuration of Power Conversion Device)

Figure 1:
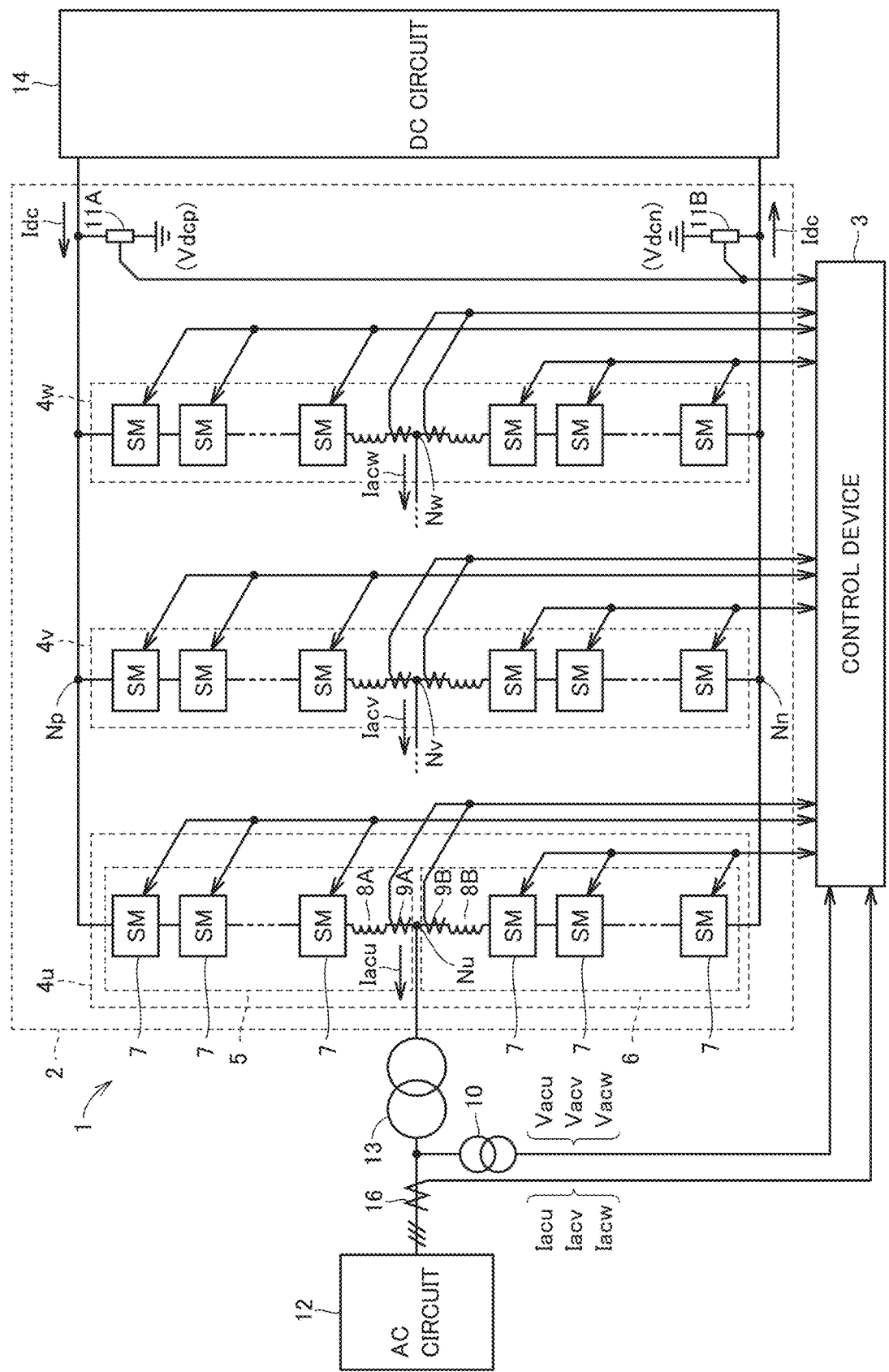
FIG. 1 is a schematic configuration diagram of a power conversion device 1 in an embodiment.

FIG. 1 is a schematic configuration diagram of a power conversion device 1 in an embodiment. Referring to FIG. 1, power conversion device 1 is configured of a modular multilevel converter which includes multiple converter cells connected in series. Note that the "converter cell" is also called a "sub-module," SM, or a "unit converter." Power conversion device 1 converts power between a DC circuit 14 and an AC circuit 12. Power conversion device 1 includes a power converter 2 and a control device 3.

Power converter 2 includes multiple leg circuits 4u, 4v, 4w (will be described as a leg circuit 4 when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between AC circuit 12 and DC circuit 14, and converts power between the circuits. AC circuit 12 shown in FIG. 1 is a three-phase AC circuit which includes three leg circuits 4u, 4v, 4w corresponding to a U phase, a V phase, and a W phase, respectively.

AC input terminals Nu, Nv, Nw provided for respective leg circuits 4u, 4v, 4w are connected to AC circuit 12 via a transformer 13. AC circuit 12 is, for example, an AC power system which includes an AC power supply, etc. For ease of illustration, FIG. 1 does not show the connection between AC input terminals Nv, Nw and transformer 13.

High-potential-side DC terminal Np and low-potential-side DC terminal Nn, which are connected in common to each leg circuit 4, are connected to DC circuit 14. DC circuit 14 is, for example, a DC power system, including a DC power grid, or a DC terminal of other power conversion devices. In the latter case, a BTB (Back To Back) system for connecting different AC power systems having different rated frequencies is formed by coupling two power conversion devices.

AC input terminals Nu, Nv, Nw may be connected to AC circuit 12 via an interconnection reactor, instead of transformer 13 in FIG. 1. Furthermore, instead of AC input terminals Nu, Nv, Nw, a primary winding may be provided for each of leg circuits 4u, 4v, 4w, and leg circuits 4u, 4v, 4w may be connected to transformer 13 or an interconnection reactor in an AC manner via a secondary winding magnetically coupled to the primary winding. In this case, the primary winding may be reactors 8A, 8B described below. In other words, leg circuit 4 is electrically (i.e., a DC manner or an AC manner) connected to AC circuit 12 via the connector provided for each of leg circuits 4u, 4v, 4w, such as AC input terminals Nu, Nv, Nw or the above primary winding.

Leg circuit 4u includes an upper arm 5 from high-potential-side DC terminal Np to AC input terminal Nu, and a lower arm 6 from low-potential-side DC terminal Nn to AC input terminal Nu. AC input terminal Nu, which is the point of connection between upper arm 5 and lower arm 6, is connected to transformer 13. High-potential-side DC terminal Np and low-potential-side DC terminal Nn are connected to DC circuit 14. Leg circuits 4v, 4w have the same configuration as leg circuit 4u, and leg circuit 4u will thus be representatively described below.

Upper arm 5 includes multiple cascade-connected converter cells 7_1 to 7_Ncell and reactor 8A. Multiple converter cells 7 and reactor 8A are connected in series. Similarly, lower arm 6 includes multiple cascade-connected converter cells 7_1 to 7_Ncell and reactor 8B. Multiple converter cells 7 and reactor 8B are connected in series. In the description below, the number of converter cells 7 included in each of upper arm 5 and lower arm 6 is set to Ncell. Ncell is set to Ncell≥2. In the description below, converter cells 7_1 to 7_Ncell may also collectively be denoted as a converter cell 7. An index i to the converter cell is irrelevant to physical arrangement of the converter cell.

Reactor 8A may be inserted anywhere in upper arm 5 of leg circuit 4u. Reactor 8B may be inserted anywhere in lower arm 6 of leg circuit 4u. Multiple reactors 8A and multiple reactors 8B may be present. The reactors may have different inductance values. Furthermore, only reactor 8A of upper arm 5 may be provided, or only reactor 8B of lower arm 6 may be provided.

Reactors 8A, 8B are provided to prevent a rapid increase of a fault current in the event of a fault of AC circuit 12 or DC circuit 14, for example. However, reactors 8A, 8B having excessive inductance values result in reduced efficiency of power converter 2. Accordingly, preferably, all the switching elements of each converter cell 7 are stopped (turned off) as soon as possible in the event of a fault.

As detectors for measuring the electrical quantities (current, voltage, etc.) for use in the control, power conversion device 1 further includes an AC voltage detector 10, an AC current detector 16, DC voltage detectors 11A, 11B, and arm current detectors 9A, 9B. Arm current detectors 9A, 9B are provided for each leg circuit 4. Signals detected by these detectors are input to control device 3.

Note that, for ease of illustration, in FIG. 1, some of signal lines for the signals input from the detectors to control device 3 and signal lines for the signals input/output to/from control device 3 and each converter cell 7 are depicted collectively, but they are, in practice, provided for each detector and each converter cell 7. The signal lines may be provided separately for transmission and reception of the signals between each converter cell 7 and control device 3. For example, an optical fiber may be adopted as the signal line.

In the following, each detector is described in detail.

AC voltage detector 10 detects a U-phase AC voltage Vacu, a V-phase AC voltage Vacv, and a W-phase AC voltage Vacw of AC circuit 12. In the description below, Vacu, Vacv, and Vacw are collectively denoted as Vac.

AC current detector 16 detects a U-phase AC current Iacu, a V-phase AC current Iacv, and a W-phase AC current Iacw of AC circuit 12. In the description below, Iacu, Iacv, and Iacw are collectively denoted as Iac.

DC voltage detector 11A detects a DC voltage Vdcp of high-potential-side DC terminal Np connected to DC circuit 14. DC voltage detector 11B detects a DC voltage Vdcn of low-potential-side DC terminal Nn connected to DC circuit 14. A difference between DC voltage Vdcp and DC voltage Vdcn is defined as a DC voltage Vdc.

Arm current detectors 9A and 9B, included in leg circuit 4u for U phase, respectively detect an upper arm current Ipu flowing through upper arm 5 and a lower arm current Inu flowing through lower arm 6. Arm current detectors 9A and 9B, included in leg circuit 4v for V phase, detect an upper arm current Ipv and a lower arm current Inv, respectively. Arm current detectors 9A and 9B, included in leg circuit 4w for W phase, detect an upper arm current Ipw and a lower arm current Inw, respectively. In the description below, upper arm currents Ipu, Ipv, and Ipw are collectively denoted as an upper arm current Iarmp, lower arm currents Inu, Inv, and Inw are collectively denoted as a lower arm current Iarmn, and upper arm current Iarmp and lower arm current Iarmn are collectively denoted as Iarm.

(Converter Cell)

Figure 2:
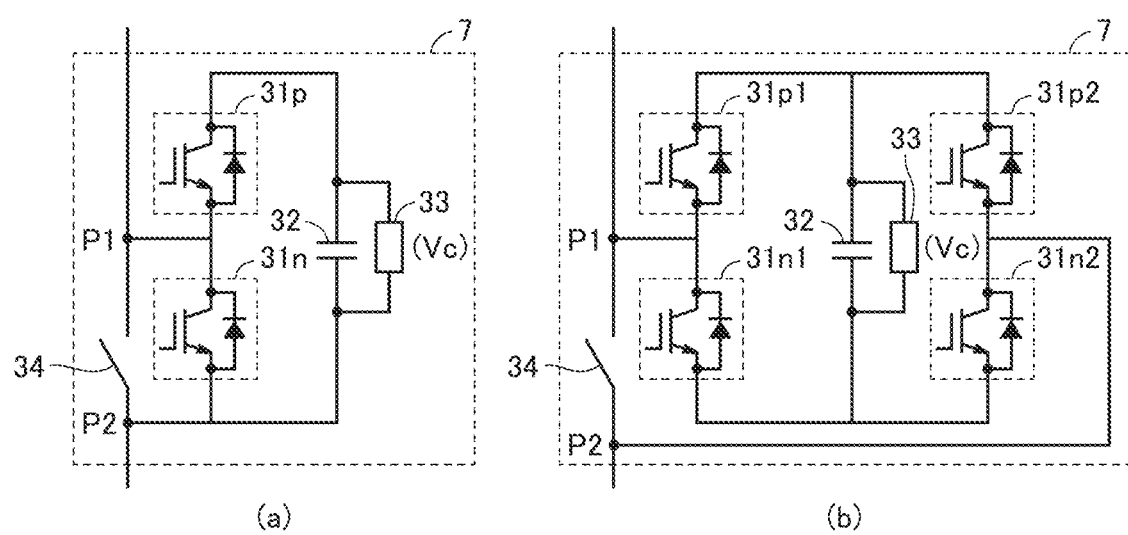
FIGS. 2(a) and (b) is a diagram showing a configuration of a converter cell 7 that makes up a power converter 2.

FIGS. 2(a) and (b) is a diagram showing a configuration of converter cell 7 that makes up power converter 2.

Converter cell 7 shown in FIG. 2(a) has a circuit configuration called a half-bridge configuration. This converter cell 7 includes a serial body formed by connecting two switching elements 31p and 31n to each other in series, a power storage element 32, a bypass switch 34, and a voltage detector 33. The serial body and power storage element 32 are connected in parallel.

Opposing terminals of switching element 31n are defined as input and output terminals P1 and P2. A voltage across ends of power storage element 32 and a zero voltage are provided as a result of switching operations by switching elements 31p and 31n. For example, when switching element 31p is turned on and switching element 31n is turned off, the voltage across ends of power storage element 32 is provided. When switching element 31p is turned off and switching element 31n is turned on, the zero voltage is provided.

Bypass switch 34 is connected between input and output terminals P1 and P2. By turning on bypass switch 34, converter cell 7 is short-circuited. As converter cell 7 is short-circuited, switching elements 31p and 31n included in converter cell 7 are protected against an overcurrent produced at the time of a fault.

Voltage detector 33 detects a voltage Vc across ends of power storage element 32.

Converter cell 7 shown in FIG. 2(b) has a circuit configuration called a full-bridge configuration. This converter cell 7 includes a first serial body formed by connecting two switching elements 31p1 and 31n1 to each other in series, a second serial body formed by connecting two switching elements 31p2 and 31n2 to each other in series, power storage element 32, bypass switch 34, and voltage detector 33. The first serial body, the second serial body, and power storage element 32 are connected in parallel.

A point intermediate between switching element 31p1 and switching element 31n1 and a point intermediate between switching element 31p2 and switching element 31n2 are defined as input and output terminals P1 and P2 of converter cell 7. The voltage across ends of power storage element 32 or the zero voltage is provided as a result of switching operations by switching elements 31p1, 31n1, 31p2, and 31n2.

Bypass switch 34 is connected between input and output terminals P1 and P2. By turning on bypass switch 34, converter cell 7 is short-circuited. As converter cell 7 is short-circuited, each element included in converter cell 7 is protected against an overcurrent produced at the time of a fault.

Voltage detector 33 detects voltage Vc across ends of power storage element 32.

In FIGS. 2(a) and (b), switching elements 31p, 31n, 31p1, 31n1, 31p2, and 31n2 are configured, for example, by connection of a freewheeling diode (FWD) in anti-parallel to a self-arc-extinguishing semiconductor switching element such as an insulated gate bipolar transistor (IGBT) and a gate commutated turn-off (GCT) thyristor.

In FIGS. 2(a) and (b), a capacitor such as a film capacitor is mainly employed as power storage element 32. Power storage element 32 may be referred to as a capacitor in the description below.

An example in which converter cell 7 has the half-bridge cell configuration shown in FIG. 2(a), a semiconductor switching element is employed as the switching element, and a capacitor is employed as the power storage element will be described below by way of example. Converter cell 7 included in power converter 2, however, may have the full-bridge configuration shown in FIG. 2(b). A converter cell in a configuration other than the configuration shown above, such as a converter cell to which a circuit configuration called a clamped double cell is applied, may be employed, and the switching element and the power storage element are not limited to the above either.

(Control Device)

Figure 3:
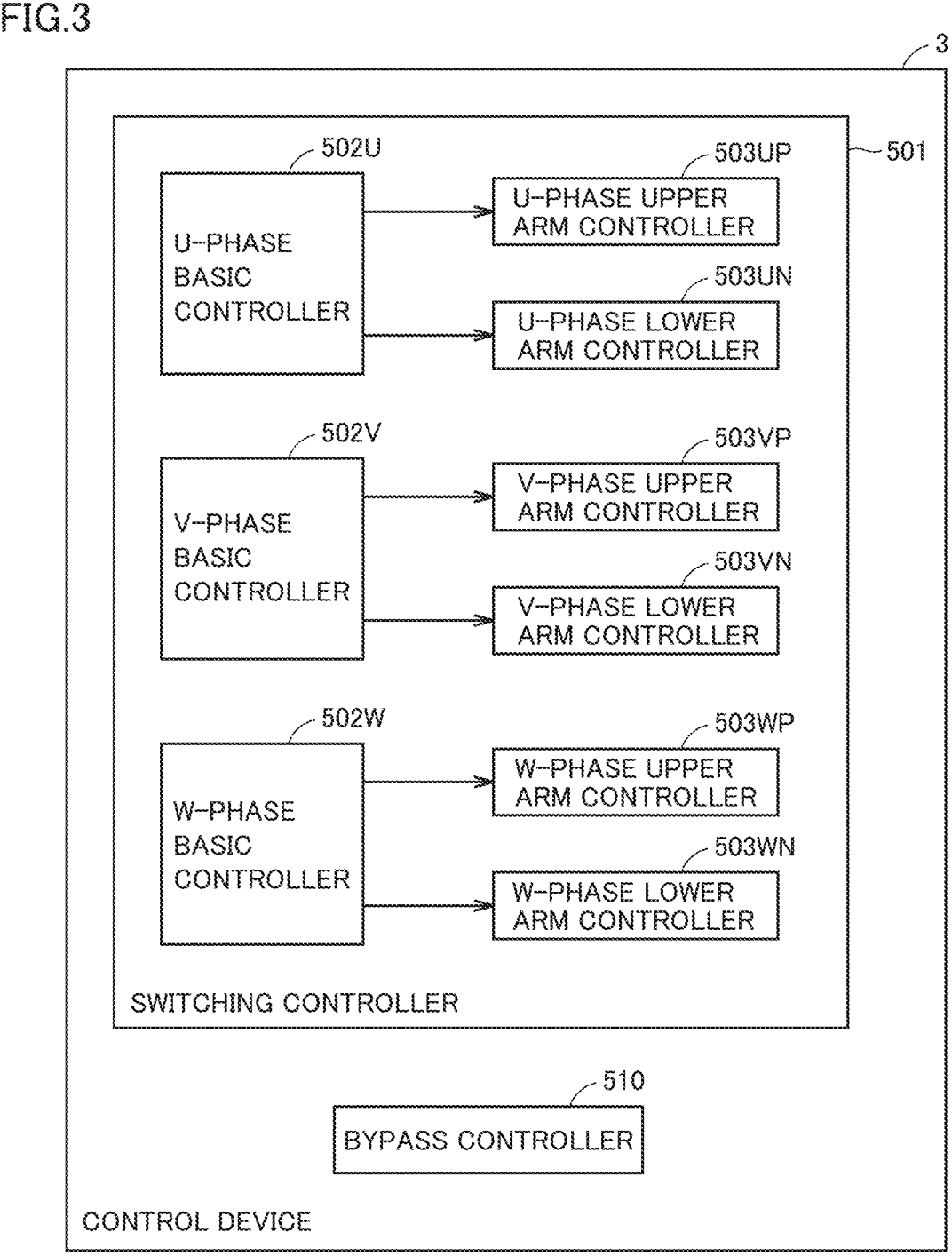
FIG. 3 is a diagram showing an internal configuration of a control device 3 in a first embodiment.

FIG. 3 is a diagram showing an internal configuration of control device 3 in a first embodiment.

Control device 3 includes a switching controller 501 and a bypass controller 510.

Switching controller 501 controls on and off of switching elements 31p and 31n in converter cell 7.

When bypass controller 510 senses failure of converter cell 7 within the arm, it protects failed converter cell 7 within the arm against an overcurrent by turning on bypass switch 34 in failed converter cell 7.

Switching controller 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the description below, U-phase basic controller 502U, V-phase basic controller 502V, and W-phase basic controller 502W are collectively denoted as a basic controller 502. U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN are collectively denoted as an arm controller 503.

Figure 4:
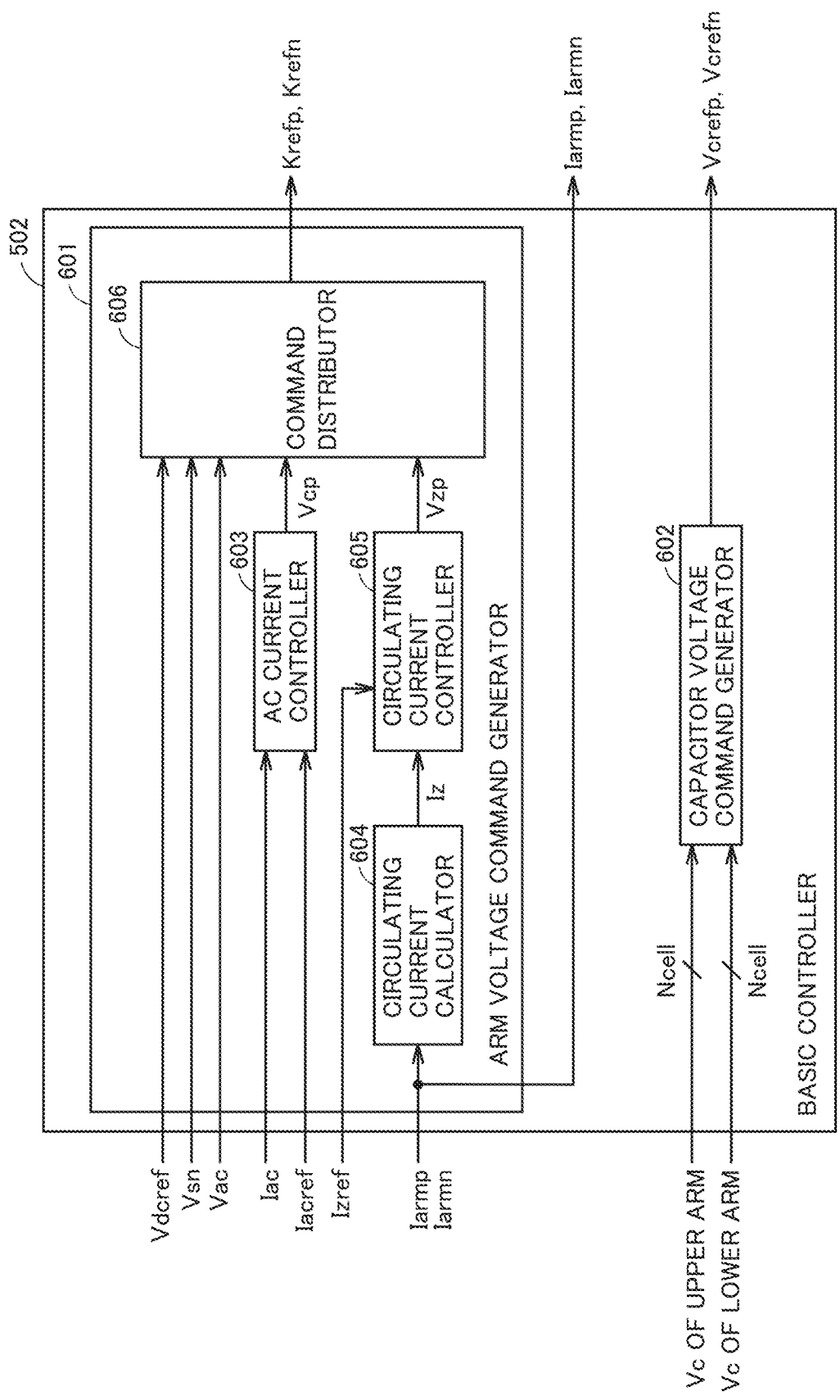
FIG. 4 is a diagram showing a configuration of a basic controller 502.

FIG. 4 is a diagram showing a configuration of basic controller 502.

Basic controller 502 includes an arm voltage command generator 601 and a capacitor voltage command generator 602.

Arm voltage command generator 601 calculates an arm voltage command value krefp for the upper arm and an arm voltage command value krefn for the lower arm. In the description below, krefp and krefn are collectively denoted as kref.

Capacitor voltage command generator 602 calculates a capacitor command voltage value Vcrefp for capacitors 32 in N converter cells 7 included in the upper arm. Capacitor voltage command generator 602 calculates a capacitor command voltage value Vcrefn for capacitors 32 in N converter cells 7 included in the lower arm. For example, an average voltage of capacitors 32 in converter cells 7 in the upper arm is defined as capacitor command voltage value Vcrefp and an average voltage of capacitors 32 in converter cells 7 in the lower arm is defined as capacitor command voltage value Vcrefn. In the description below, Vcrefp and Vcrefn are collectively denoted as Vcref.

Arm voltage command generator 601 includes an AC current controller 603, a circulating current calculator 604, a circulating current controller 605, and a command distributor 606.

AC current controller 603 calculates an AC control command value Vcp such that a difference between detected AC current Iac and a set AC current command value Iacref is set to 0.

Circulating current calculator 604 calculates a circulating current Iz that flows through one leg circuit 4 based on arm current Iarmp in the upper arm and arm current Iarmp in the lower arm. The circulating current is a current that circulates among a plurality of leg circuits 4. For example, circulating current Iz that flows through one leg circuit 4 can be calculated in accordance with an expression below.

$$Idc=(Ipu+Ipv+Ipw+Inu+Inv+Inw)/2 \quad (1)$$

$$Iz=(Iarmp+Iarmn)/2-Idc/3 \quad (2)$$

Circulating current controller 605 calculates a circulation control command value Vzp for controlling circulating current Iz to follow a set circulating current command value Izref such as 0.

Command distributor 606 receives AC control command value Vcp, circulation control command value Vzp, a DC voltage command value Vdcref, a neutral point voltage Vsn, and AC voltage Vac. Since an AC side of power converter 2 is connected to AC circuit 12 with transformer 13 being interposed, neutral point voltage Vsn can be calculated based on a voltage of a DC power supply of DC circuit 14. DC voltage command value Vdcref may be provided under DC output control or may be set to a constant value.

Based on these inputs, command distributor 606 calculates voltages to be supplied by the upper arm and the lower arm. Command distributor 606 determines arm voltage command value krefp for the upper arm and arm voltage command value krefn for the lower arm by subtracting voltage lowering due to an inductance component within the upper arm and the lower arm from respective calculated voltages.

Determined arm voltage command value krefp for the upper arm and arm voltage command value krefn for the lower arm serve as output voltage commands to control AC current Iac to follow AC current command value Iacref, to control circulating current Iz to follow circulating current command value Izref, to control DC voltage Vdc to follow DC voltage command value Vdcref, and to feedforward-control AC voltage Vac.

Basic controller 502 provides arm current Iarmp of the upper arm, arm current Iarmn of the lower arm, arm voltage command value krefp for the upper arm, arm voltage command value krefn for the lower arm, capacitor command voltage value Vcrefp for the upper arm, and capacitor command voltage value Vcrefn for the lower arm.

Figure 5:
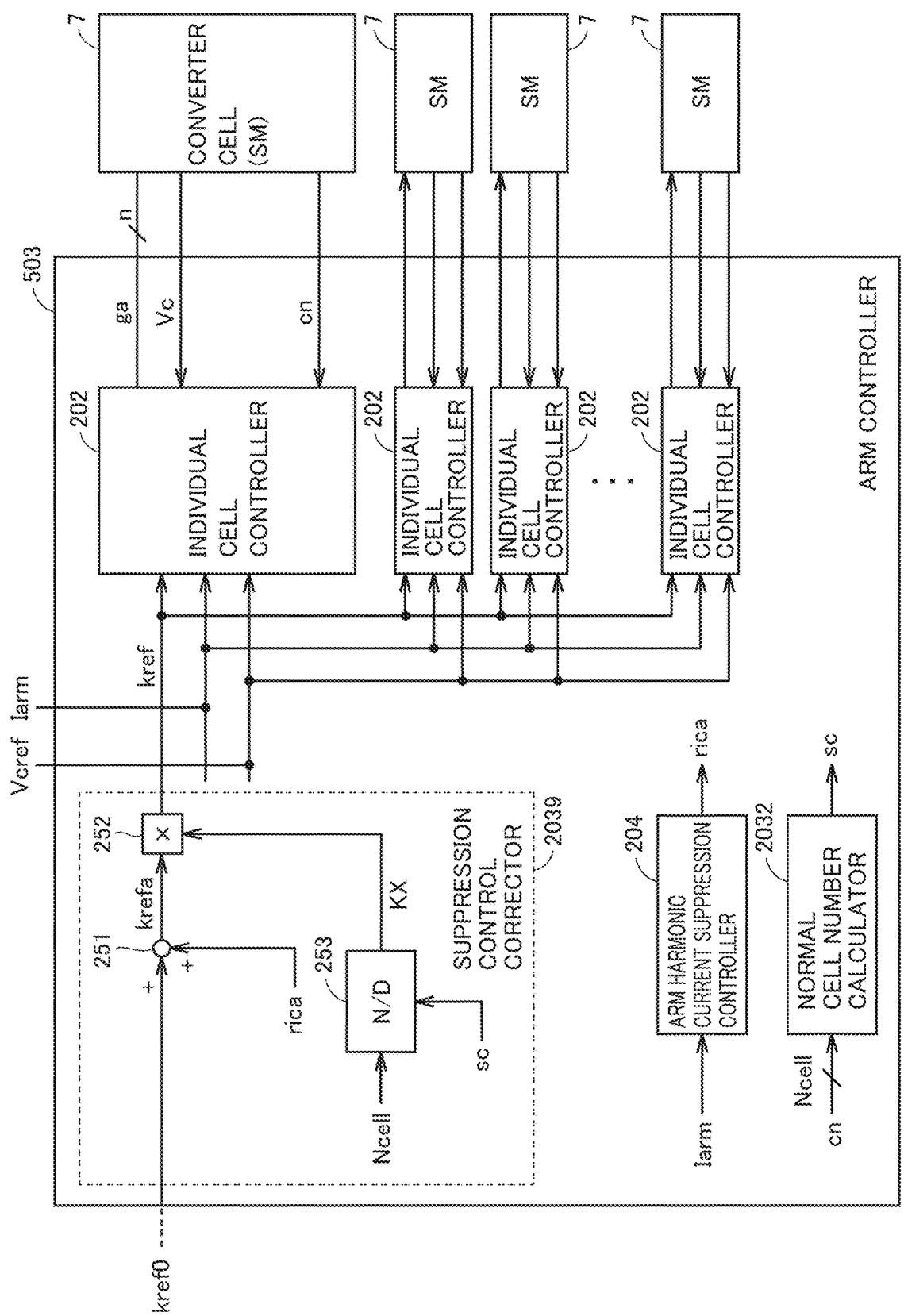
FIG. 5 is a diagram showing a configuration of an arm controller 503.

FIG. 5 is a diagram showing a configuration of arm controller 503.

When arm controller 503 senses failure of converter cell 7, it controls a normal converter cell within the arm to suppress a ratio of a harmonic component in the arm current that increases due to failure. More specifically, arm controller 503 controls a normal converter cell within the arm based on a harmonic suppression control output value for suppressing the harmonic component in the arm current that increases due to failure.

Arm controller 503 includes a normal cell calculator 2032, an arm harmonic current suppression controller 204, a suppression control corrector 2039, and Ncell individual cell controllers 202.

Normal cell calculator 2032 provides the total number sc of normal cells that represents the total number of normal converter cells within the arm by adding cell normality determination signals cn sent from Ncell converter cells 7 within the arm.

Arm harmonic current suppression controller 204 provides a harmonic current suppression control output value rica based on arm current Iarm.

Figure 6:
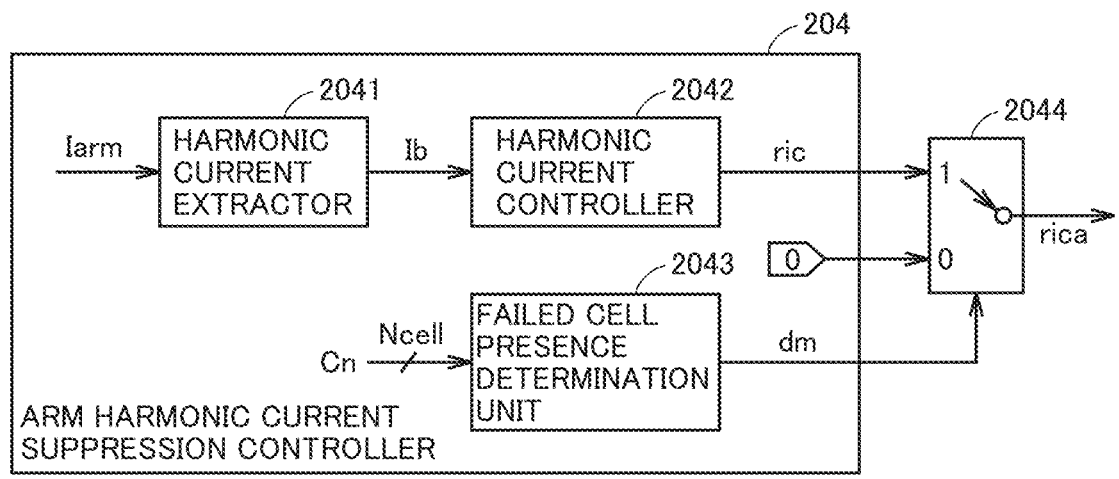
FIG. 6 is a control block diagram showing an internal configuration of an arm harmonic current suppression controller 204 in the first embodiment.

FIG. 6 is a control block diagram showing an internal configuration of arm harmonic current suppression controller 204 in the first embodiment.

Arm harmonic current suppression controller 204 includes a harmonic current extractor 2041, a harmonic current controller 2042, a failed cell presence determination unit 2043, and a signal switch 2044.

Harmonic current extractor 2041 extracts a harmonic current component Ib included in arm current Iarm that flows through the arm. For example, extracted harmonic current component Ib can include a frequency component at a switching frequency fx of converter cell 7, a frequency component fy which is an integral multiple of fx, and a frequency component at a frequency fz of a sideband wave of fx and fy. Alternatively, extracted harmonic current component Ih can also be a frequency component k1 times, k2 times, or k3 times as high a frequency (switching frequency) f1 of the fundamental wave of an AC current from AC circuit 12. Harmonic current extractor 2041 can extract harmonic current component Ih that increases with bypass of a failed converter cell.

Harmonic current controller 2042 provides a suppression control value ric for suppressing extracted harmonic current component Ih. Suppression control value ric does not have to be a value to set extracted harmonic current component Ih completely to zero. For example, harmonic current controller 2042 provides suppression control value ric under proportional control.

Failed cell presence determination unit 2043 receives cell normality determination signals cn from Ncell converter cells 7 within the arm and provides a failure presence determination signal dm. When there is at least one failed converter cell within the arm, failure presence determination signal dm is set to "1". When there is no failed converter cell within the arm, failure presence determination signal dm is set to "0".

Signal switch 2044 receives suppression control value ric and a zero signal representing a zero voltage. Signal switch 2044 provides a signal selected depending on failure presence determination signal dm. When there is at least one failed converter cell within the arm, failure presence determination signal dm is set to "1" and suppression control value ric is provided as harmonic current suppression control output value rica. When there is no failed converter cell within the arm, failure presence determination signal dm is set to "0" and the zero signal is provided as harmonic current suppression control output value rica.

Referring again to FIG. 5, suppression control corrector 2039 corrects an arm voltage command value kref0 based on harmonic current suppression control output value rica and provides a corrected arm voltage command value kref.

Suppression control corrector 2039 includes an adder 251, a divider 253, and a multiplier 252.

Adder 251 provides a suppression arm voltage command value krefa by adding arm voltage command value kref0 provided from basic controller 502 and harmonic current suppression control output value rica.

Divider 253 provides a conversion coefficient KX by dividing the total number Ncell of converter cells within the arm by the total number sc of normal converter cells within the arm, where relation of KX≥1 is satisfied.

Multiplier 252 provides corrected arm voltage command value kref by multiplying suppression arm voltage command value krefa by conversion coefficient KX. In other words, suppression arm voltage command value krefa is amplified by Ncell/sc times.

Individual cell controller 202 individually controls corresponding converter cell 7. Individual cell controller 202 receives arm current Iarm and capacitor command voltage value Vcref from basic controller 502 and receives corrected arm voltage command value kref from suppression control corrector 2039.

Individual cell controller 202 receives a capacitor voltage Vc and cell normality determination signal cn from corresponding converter cell 7. The cell normality determination signal is set to "1" when converter cell 7 is normal, and the cell normality determination signal is set to "0" when converter cell 7 has failed. Individual cell controller 202 generates a gate signal ga for corresponding converter cell 7 and provides the gate signal to corresponding converter cell 7.

Figure 7:
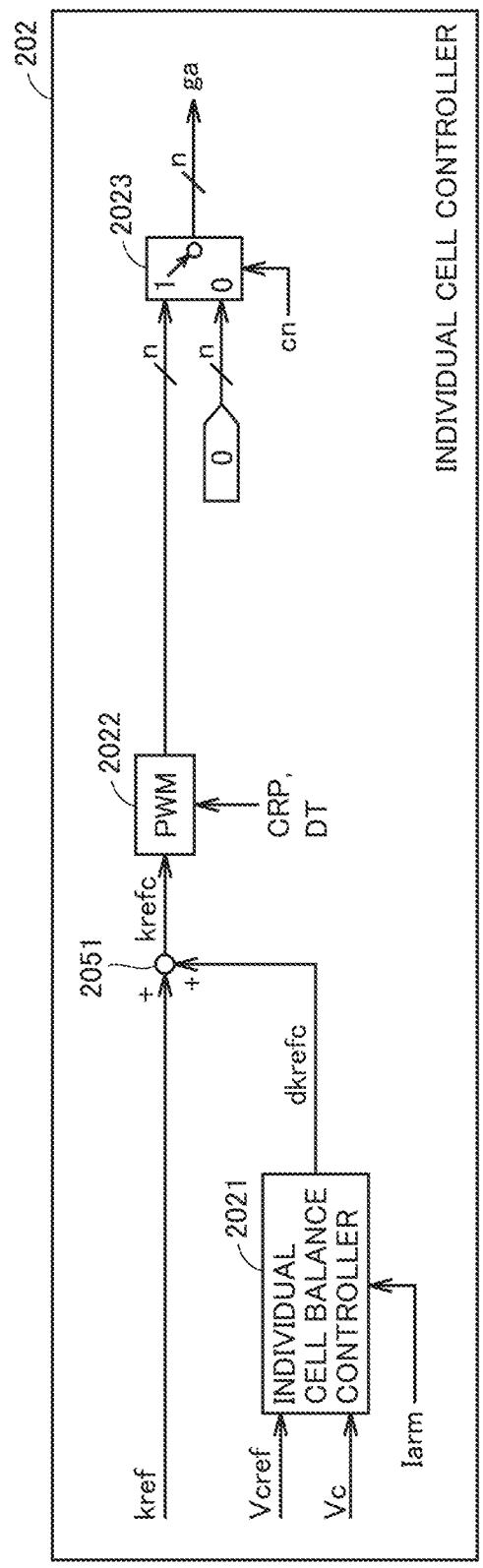
FIG. 7 is a diagram showing a configuration of an individual cell controller 202.

FIG. 7 is a diagram showing a configuration of individual cell controller 202.

Individual cell controller 202 includes an individual cell balance controller 2021, a PWM modulator 2022, a signal switch 2023, and an adder 2051.

Individual cell balance controller 2021 provides an individual cell balance control output dkrefc such that capacitor voltage Vc matches with capacitor command voltage value Vcref based on capacitor command voltage value Vcref, capacitor voltage Vc of corresponding converter cell 7, and arm current Iarm. For example, individual cell balance controller 2021 can generate individual cell balance control output dkrefc based on a result of multiplication of a difference between Vcref and Vc by a gain K.

Adder 2051 adds individual cell balance control output dkrefc and corrected arm voltage command value kref. A result of addition is provided as cell voltage command value krefc.

PWM modulator 2022 provides a PWM modulated signal by modulating cell voltage command value krefc in accordance with phase shift PWM with a carrier reference phase CRP and a dead time DT being defined as parameters. PWM modulator 2022 performs modulation depending on a configuration of corresponding converter cell 7. Depending on the configuration of converter cell 7, the number n of provided PWM modulated signals also increases or decreases. For example, in the case of a half-bridge cell, n is set to n=2, and in the case of a full-bridge cell, n is set to n=4.

When there are Ncell converter cells 7 in one arm, intervals among Ncell PWM carrier phases within one arm become even by allocating phases different by 360°/Ncell to PWM modulators 2022 in converter cells 7 within one arm. Thus, a harmonic component in the output voltage from each converter cell 7 can be canceled and an equivalent switching frequency of the output voltage from one arm can be high. When converter cell 7 fails and the output voltage from failed converter cell 7 becomes zero, however, the harmonic component in the output voltage from each converter cell 7 cannot be canceled. Consequently, the harmonic component in the output voltage from each converter cell 7 remains in the output voltage from the arm.

Signal switch 2023 receives the PWM modulated signal and a zero signal representing a zero voltage. Signal switch 2023 provides a signal selected depending on cell normality determination signal cn. When converter cell 7 is normal, cell normality determination signal cn is set to "1" and the PWM modulated signal is provided. When converter cell 7 fails, cell normality determination signal cn is set to "0" and the zero signal is provided. The signal provided from signal switch 2023 is sent to a gate driver for switching elements 31p and 31n in corresponding converter cell 7 as gate signal ga to control switching of switching elements 31p and 31n in corresponding converter cell 7.

(Operations by Control Device 3)

Operations by control device 3 in each of a case where all converter cells 7 are normal and a case where at least one converter cell 7 has failed will be described below.

(Operations when All Converter Cells 7 within Arm are Normal)

Operations by control device 3 when all converter cells 7 within the arm are normal will be described.

When all converter cells 7 within the arm are normal, cell normality determination signals cn for all converter cells 7 within the arm are set to "1". Thus, failure presence determination signal dm provided from failed cell presence determination unit 2043 within arm harmonic current suppression controller 204 is set to 0. Consequently, signal switch 2044 provides the zero signal as harmonic current suppression control output value rica.

Adder 251 provides arm voltage command value kref0 as suppression arm voltage command value krefa. Conversion coefficient KX provided from divider 253 is set to "1". Therefore, corrected arm voltage command value kref is equal to arm voltage command value kref0.

Adder 2051 within individual cell controller 202 adds arm voltage command value kref0 and individual cell balance control output dkrefc and provides cell voltage command value krefc. PWM modulator 2022 within individual cell controller 202 provides the PWM modulated signal based on cell voltage command value krefc. Signal switch 2023 within individual cell controller 202 provides the PWM modulated signal as gate signal ga because cell normality determination signal cn has been set to "1".

(Operations when Failed Converter Cell 7 is Included within Arm)

Operations when failed converter cell 7 is included within the arm will be described.

When failed converter cell 7 is included within the arm, failure presence determination signal dm provided from failed cell presence determination unit 2043 within arm harmonic current suppression controller 204 is set to "1". Consequently, signal switch 2044 provides suppression control value ric as harmonic current suppression control output value rica.

Adder 251 adds arm voltage command value krerf0 and harmonic current suppression control output value rica to provide suppression arm voltage command value krefa.

Divider 253 divides the total number Ncell of converter cells within the arm by the total number sc of normal converter cells within the arm to provide conversion coefficient KX.

Multiplier 252 multiplies suppression arm voltage command value krefa by conversion coefficient KX to provide corrected arm voltage command value kref.

Adder 2051 within individual cell controller 202 adds corrected arm voltage command value kref and individual cell balance control output dkrefc and provides cell voltage command value krefc. PWM modulator 2022 within individual cell controller 202 provides the PWM modulated signal based on cell voltage command value krefc.

Signal switch 2023 within individual cell controller 202 corresponding to the normal converter cell provides the PWM modulated signal as gate signal ga, because cell normality determination signal cn has been set to "1". Signal switch 2023 within individual cell controller 202 corresponding to the failed converter cell provides the zero signal as gate signal ga because cell normality determination signal cn has been set to "0".

As a result of the operations above, the arm harmonic current that has increased as a result of bypass of the failed converter cell can be suppressed. Consequently, power conversion device 1 can continue operating without protective suspension of power conversion device 1 due to deviation of capacitor voltages of some converter cells 7 from the protection level.

(Hardware Configuration of Control Device 3)

Figure 8:
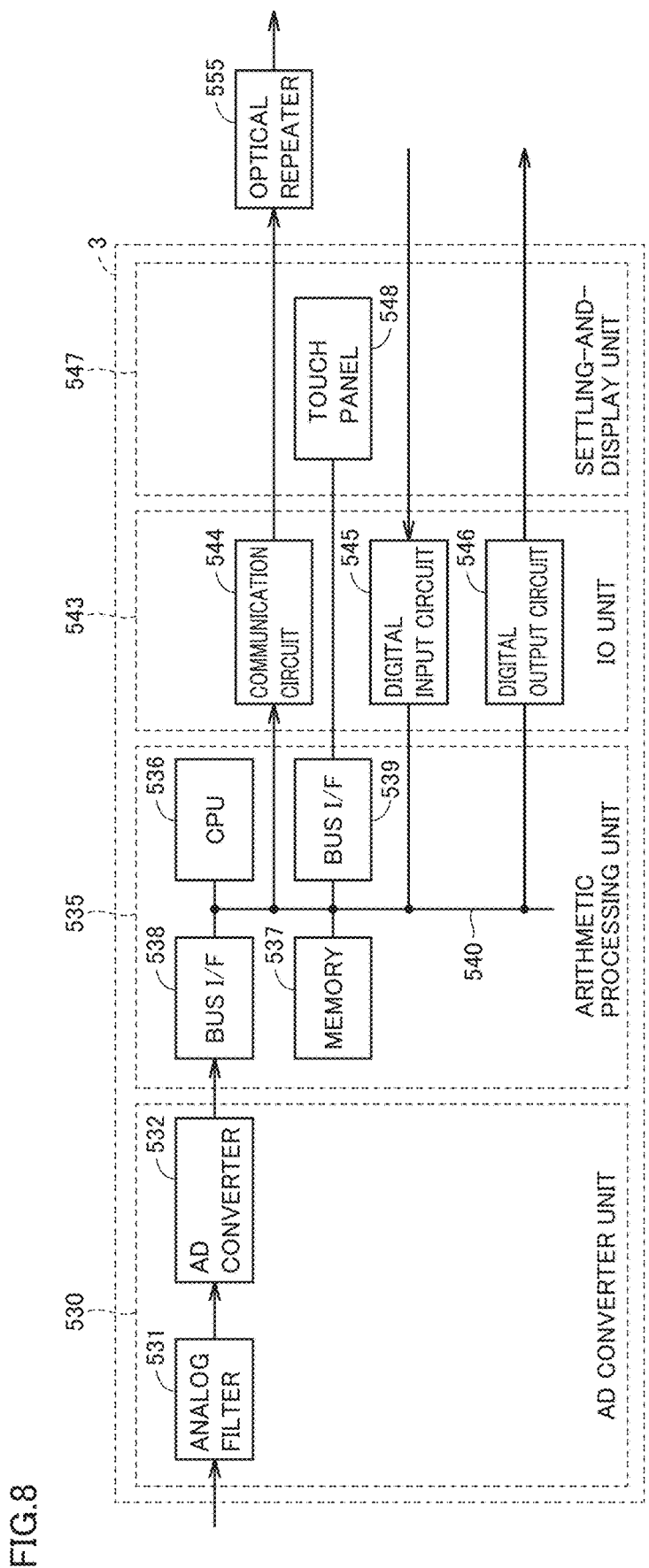
FIG. 8 is a diagram showing an exemplary hardware configuration of control device 3.

FIG. 8 is a diagram showing an exemplary hardware configuration of control device 3.

Control device 3 is configured similarly to what is called a digital relay device. Control device 3 includes an analog-digital (AD) converter unit 530, an arithmetic processing unit 535, an input and output (IO) unit 543, and a settling-and-display unit 547.

In a stage preceding AD converter unit 530, a plurality of transformers (not shown) to convert input signals from arm current detectors 9A and 9B, AC voltage detector 10, AC current detector 16, DC voltage detector 11B, and voltage detector 33 to a voltage level suitable for signal processing within control device 3 may be provided.

AD converter unit 530 includes an analog filter 531 and an AD converter 532. Analog filter 531 is a low-pass filter provided to remove an aliasing error in AD conversion. AD converter 532 converts the signal that has passed through analog filter 531 into a digital value.

While FIG. 8 representatively shows only one channel as the input to AD converter unit 530, AD converter unit 530, in practice, has a multiple-input configuration to receive the signals from the respective detectors. Accordingly, more specifically, AD converter unit 530 includes multiple analog filters 531, and a multiplexer (not shown) for selecting signals having passed through analog filters 531.

Arithmetic processing unit 535 includes a central processing unit (CPU) 536, a memory 537, bus interfaces 538, 539, and a bus 540 connecting these components. CPU 536 controls the entire operation of control device 3. Memory 537 is used as a primary storage for CPU 536. Furthermore, by including a nonvolatile memory, such as a flash memory, memory 537 stores programs, and settings values for the signal processing.

Note that arithmetic processing unit 535 may be configured of any circuit that has computing functionality, and is not limited to the example of FIG. 8. For example, arithmetic processing unit 535 may include multiple CPUs. Instead of the processor such as CPU, arithmetic processing unit 535 may be configured of at least one ASIC (Application Specific Integrated Circuit), or at least one FPGA (Field Programmable Gate Array). Alternatively, arithmetic processing unit 535 may be configured of any combination of the processor, ASIC, and FPGA.

IO unit 543 includes a communication circuit 544, a digital input circuit 545, and a digital output circuit 546. Communication circuit 544 generates an optical signal to be provided to each converter cell 7. The signal provided from communication circuit 544 is transmitted to converter cell 7 through an optical repeater 555. Digital input circuit 545 and digital output circuit 546 are interface circuits for communication between CPU 536 and external devices. For example, digital output circuit 546 provides a trip signal to AC circuit 12.

Settling-and-display unit 547 includes a touch panel 548 for inputting settling values and for display. Touch panel 548 is an input/output interface which is a combination of a visual display, such as a liquid crystal panel, and an input device, such as a touchpad. Touch panel 548 is connected to bus 540 via bus interface 539.

Second Embodiment

Harmonic current suppression control is provided for each arm in the first embodiment. In contrast, in a second embodiment, a harmonic component in a current that flows through a converter cell is suppressed based on arm currents of all arms.

Figure 9:
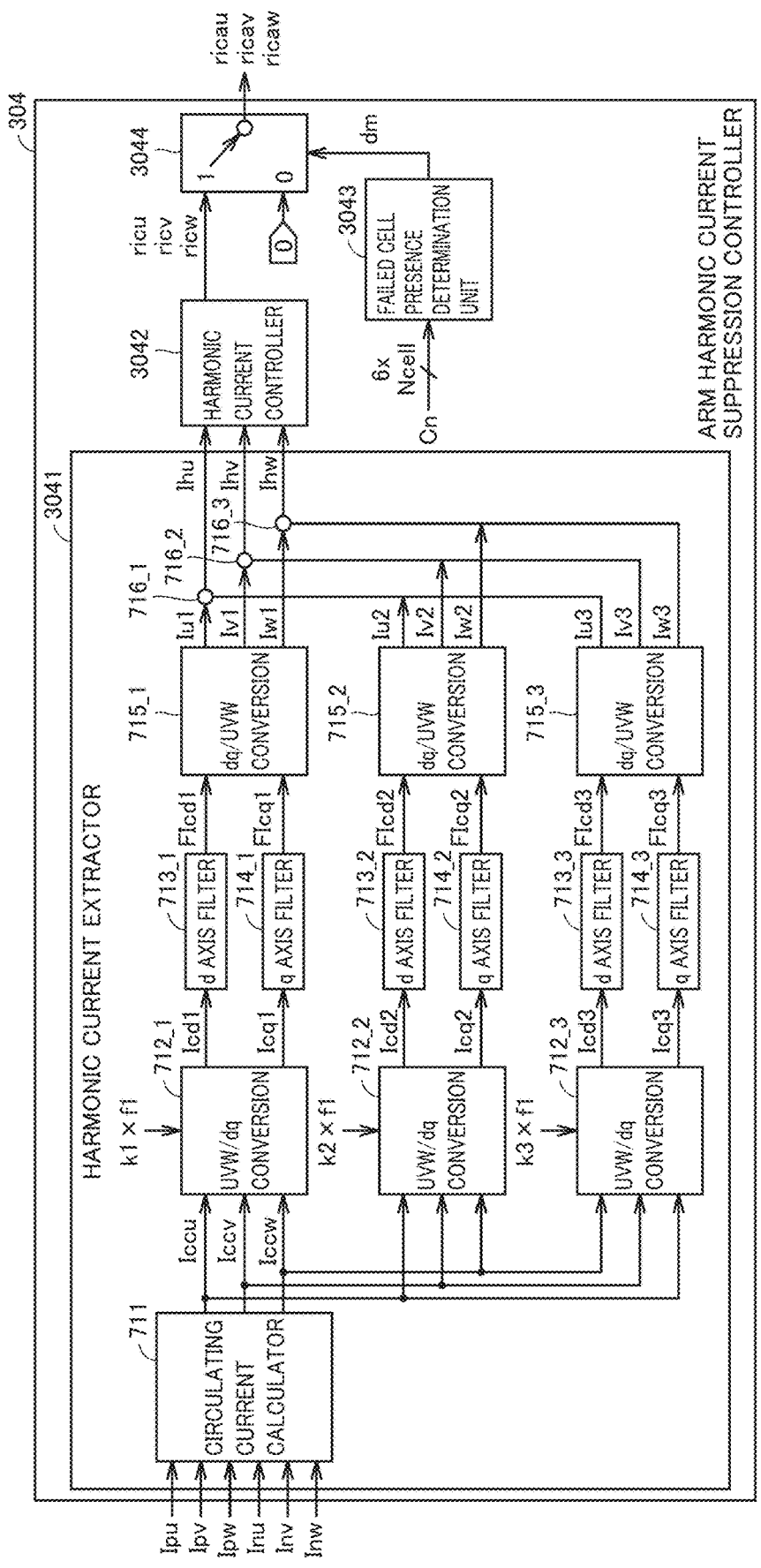
FIG. 9 is a control block diagram showing an internal configuration of an arm harmonic current suppression controller 304 in a second embodiment.

FIG. 9 is a control block diagram showing an internal configuration of an arm harmonic current suppression controller 304 in the second embodiment.

Arm harmonic current suppression controller 304 includes a harmonic current extractor 3041, a harmonic current controller 3042, a failed cell presence determination unit 3043, and a signal switch 3044.

Harmonic current extractor 3041 extracts a harmonic current component included in arm currents Ipu, Inu, Ipv, Inv, Ipw, and Inw of respective phases. The extracted harmonic current component is defined as a frequency component k1 times, k2 times, or k3 times as high as frequency (switching frequency) f1 of the fundamental wave of an AC current from AC circuit 12.

Harmonic current extractor 3041 includes a circulating current calculator 711, first coordinate converters 712_1, 712_2, and 712_3, d-axis filters 713_1, 713_2, and 713_3, q-axis filters 714_1, 714_2, and 714_3, second coordinate converters 715_1, 715_2, and 715_3, and adders 716_1, 716_2, and 716_3.

Circulating current calculator 711 calculates circulating currents Iccu, Iccv, and Iccw that flow through respective leg circuits 4u, 4v, and 4w based on arm currents Ipu, Inu, Ipv, Inv, Ipw, and Inw of respective phases. The circulating current refers to a current that circulates through the plurality of leg circuits 4.

Circulating current calculator 711 calculates circulating current Iccu that flows through U-phase leg circuit 4u, circulating current Iccv that flows through V-phase leg circuit 4v, and circulating current Iccw that flows through W-phase leg circuit 4w, in accordance with expressions below.

$$Idc = (Ipu+Ipv+Ipw+Inu+Inv+Inw)/2 \qquad (3)$$

$$Iccu = (Ipu+Inu)/2 - Idc/3 \qquad (4)$$

$$Iccv = (Ipv+Inv)/2 - Idc/3 \qquad (5)$$

$$Iccw = (Ipw+Inw)/2 - Idc/3 \qquad (6)$$

First coordinate converter 712_1 converts circulating current components Iccu, Iccv, and Iccw of three phases of U, V, and W onto a dq two-phase coordinate that rotates at a frequency k1 times as high as frequency f1 of the AC current provided from power converter 2. Resultant Icd1 represents an effective component and Icq1 represents a reactive component, both of which represent a DC quantity.

d-axis filter 713_1 removes a component other than the DC component of Icd1 and provides FIcd1. q-axis filter 714_1 removes a component other than the DC component of Icq1 and provides FIcq1.

Second coordinate converter 715_1 converts two-phase DC components FIcd1 and FIcq1 into three-phase current components Iu1, Iv1, and Iw1.

First coordinate converter 712_2 converts circulating current components Iccu, Iccv, and Iccw of three phases of U, V, and W onto the dq two-phase coordinate that rotates at a frequency k2 times as high as frequency f1 of the AC current provided from power converter 2. Resultant Icd2 represents an effective component and Icq2 represents a reactive component, both of which represent a DC quantity.

d-axis filter 713_2 removes a component other than the DC component of Icd2 and provides FIcd2. q-axis filter 714_2 removes a component other than the DC component of Icq2 and provides FIcq2.

Second coordinate converter 715_2 converts two-phase DC components FIcd2 and FIcq2 into three-phase current components Iu2, Iv2, and Iw2.

First coordinate converter 712_3 converts circulating current components Iccu, Iccv, and Iccw of three-phases of U, V, and W onto the dq two-phase coordinate that rotates at a frequency k3 times as high as frequency f1 of the AC current provided from power converter 2. Resultant Icd3 represents an effective component and Icq3 represents a reactive component, both of which represent a DC quantity.

d-axis filter 713_3 removes a component other than the DC component of Icd3 and provides FIcd3. q-axis filter 714_3 removes a component other than the DC component of Icq3 and provides FIcq3.

Second coordinate converter 715_3 converts two-phase DC components FIcd3 and FIcq3 into three-phase current components Iu3, Iv3, and Iw3.

Adder 716-1 adds Iu1, Iu2, and Iu3 and provides a U-phase harmonic current component Ihu. Adder 716-2 adds Iv1, Iv2, and Iv3 and provides a V-phase harmonic current component Ihv. Adder 716-3 adds Iw1, Iw2, and Iw3 and provides a W-phase harmonic current component Ihw.

Harmonic current controller 3042 provides a U-phase suppression control value ricu, a V-phase suppression control value ricv, and a W-phase suppression control value ricw for suppressing extracted harmonic current components Ihu, Ihv, and Ihw. For example, harmonic current controller 3042 provides suppression control values ricu, ricv, and ricw under proportional control.

Failed cell presence determination unit 3043 receives cell normality determination signals cn from 6×Ncell converter cells 7 within all arms and provides failure presence determination signal dm. When there is at least one failed converter cell within all arms, failure presence determination signal dm is set to "1". When there is no failed converter cell within those arms, failure presence determination signal dm is set to "0".

Signal switch 3044 receives suppression control values ricu, ricv, and ricw and a zero signal representing a zero voltage. Signal switch 3044 provides a signal selected depending on failure presence determination signal dm. When there is at least one failed converter cell within all arms, failure presence determination signal dm is set to "1" and suppression control values ricu, ricv, and ricw are provided as harmonic current suppression control output values ricau, ricav, and ricaw. When there is no failed converter cell in those arms, failure presence determination signal dm is set to "0" and the zero signal is provided as harmonic current suppression control output values ricau, ricav, and ricaw.

U-phase harmonic suppression control output value ricau is sent to U-phase upper arm controller 503UP and U-phase lower arm controller 503UN. Adder 251 shown in FIG. 5 in each of U-phase upper arm controller 503UP and U-phase lower arm controller 503UN adds U-phase harmonic suppression control output value ricau and arm voltage command value kref0. Since operations by other constituent elements shown in FIG. 5 are similar to those described in the first embodiment, description will not be repeated.

V-phase harmonic suppression control output value ricav is sent to V-phase upper arm controller 503VP and V-phase lower arm controller 503VN. Adder 251 shown in FIG. 5 in each of V-phase upper arm controller 503VP and V-phase lower arm controller 503VN adds V-phase harmonic suppression control output value ricav and arm voltage command value kref0. Since operations by other constituent elements shown in FIG. 5 are similar to those described in the first embodiment, description will not be repeated.

W-phase harmonic suppression control output value ricaw is sent to W-phase upper arm controller 503WP and W-phase lower arm controller 503WN. Adder 251 shown in FIG. 5 in each of W-phase upper arm controller 503WP and W-phase lower arm controller 503WN adds W-phase harmonic suppression control output value ricaw and arm voltage command value kref0. Since operations by other constituent elements shown in FIG. 5 are similar to those described in the first embodiment, description will not be repeated.

Though three frequencies k1×f1, k2×f1, and k3×f1 are used in the description above, limitation thereto is not intended. Any number of frequencies which are multiples of f1 may be used. Alternatively, a single frequency (1×f1) alone may be used.

Third Embodiment

It is when an AC output current and a DC output current from power converter 2 are low and an effective value of an arm current is small that there is a concern about imbalance in capacitor voltages in normal converter cells 7 due to increase in harmonic component of arm current Iarm when converter cell 7 fails.

Though individual cell balance control is sufficiently effective when the effective value of the arm current is large, it may not be sufficiently effective when the effective value of the arm current is small.

AC output power and DC output power, however, are determined by a higher-order command. Therefore, the AC output current and the DC output current cannot freely be set. Since a circulating current of a DC component and an AC fundamental wave component is basically used for controlling balance in average value of each phase of capacitor voltages of converter cells 7 or controlling balance in average value between the upper arm and the lower arm, there is no degree of freedom.

In a third embodiment, when the AC output current and the DC output current from power converter 2 are low to such an extent that the capacitor voltages of converter cells 7 within the arm are not balanced, a current at a frequency different from a frequency of a current provided from power converter 2 is circulated within power converter 2. Since the effective value of the arm current is thus larger, individual cell balance control is sufficiently effective and imbalance among converter cells 7 is rectified. The current at the frequency different from the frequency of the current provided from power converter 2 refers to a current other than a DC current and an AC current (a current of the fundamental wave) provided from AC circuit 12.

Figure 10:
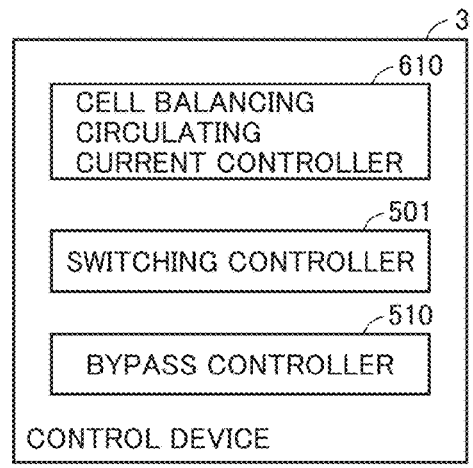
FIG. 10 is a diagram showing a configuration of control device 3 in a third embodiment.

FIG. 10 is a diagram showing a configuration of control device 3 in the third embodiment.

Control device 3 in the third embodiment includes switching controller 501 and bypass controller 510 similarly to control device 3 in the first embodiment and includes a cell balancing circulating current controller 610.

When cell balancing circulating current controller 610 senses failure of converter cell 7 in any of the plurality of arms, it has a current circulated within power converter 2 in order to increase the effective value of arm current Iarm, the current having a frequency different from the frequency of the current provided from power converter 2.

Figure 11:
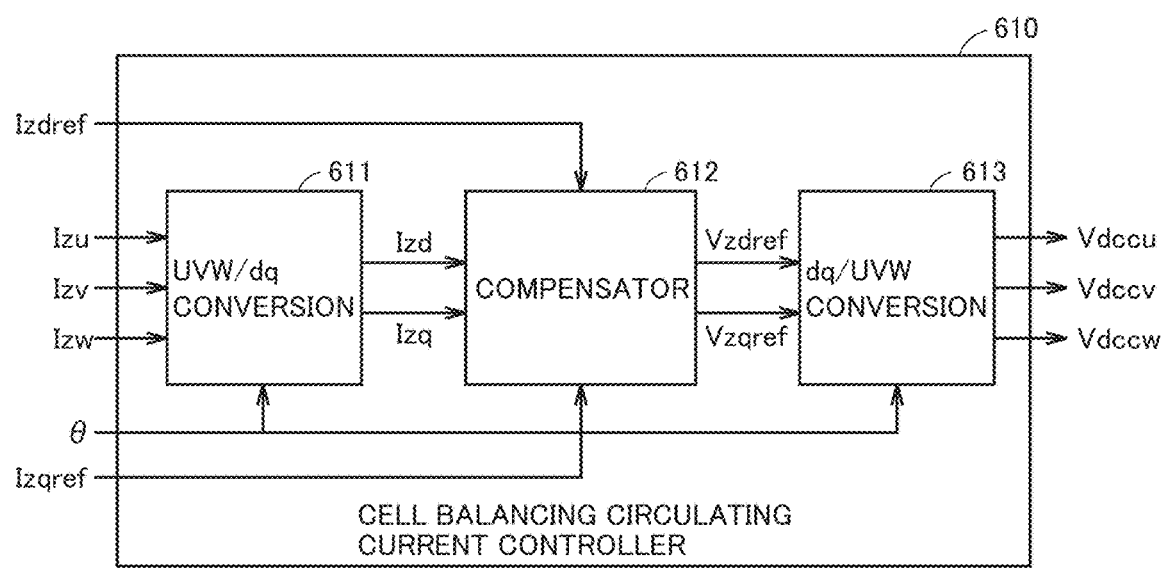
FIG. 11 is a diagram showing a configuration of a cell balancing circulating current controller 610.

FIG. 11 is a diagram showing a configuration of cell balancing circulating current controller 610.

Cell balancing circulating current controller 610 includes a first coordinate converter 611, a compensator 612, and a second coordinate converter 613.

First coordinate converter 611 converts circulating current components Izu, Izv, and Izw of three phases of U, V, and W onto a dq two-phase coordinate that rotates at a frequency θ different from the frequency of the current provided from power converter 2. Resultant Izd represents an effective component and Izq represents a reactive component, both of which represent a DC quantity.

Compensator 612 provides two-phase DC voltage command components Vzdref and Vzqref such that two-phase circulating current components Izd and Izq follow circulating current command components Izdref and Izqref converted to the two phases.

Second coordinate converter 613 converts two-phase DC voltage command components Vzdref and Vzqref calculated by compensator 612 to three-phase DC voltage command circulating current components Vdccu, Vdccv, and Vdccw. V DC voltage command circulating current components dccu, Vdccv, and Vdccw are sent to arm voltage command generators 601 of U-phase basic controller 502U, V-phase basic controller 502V, and W-phase basic controller 502W, respectively. In the description below, Vdccu, Vdccv, and Vdccw are collectively denoted as Vdcc.

Figure 12:
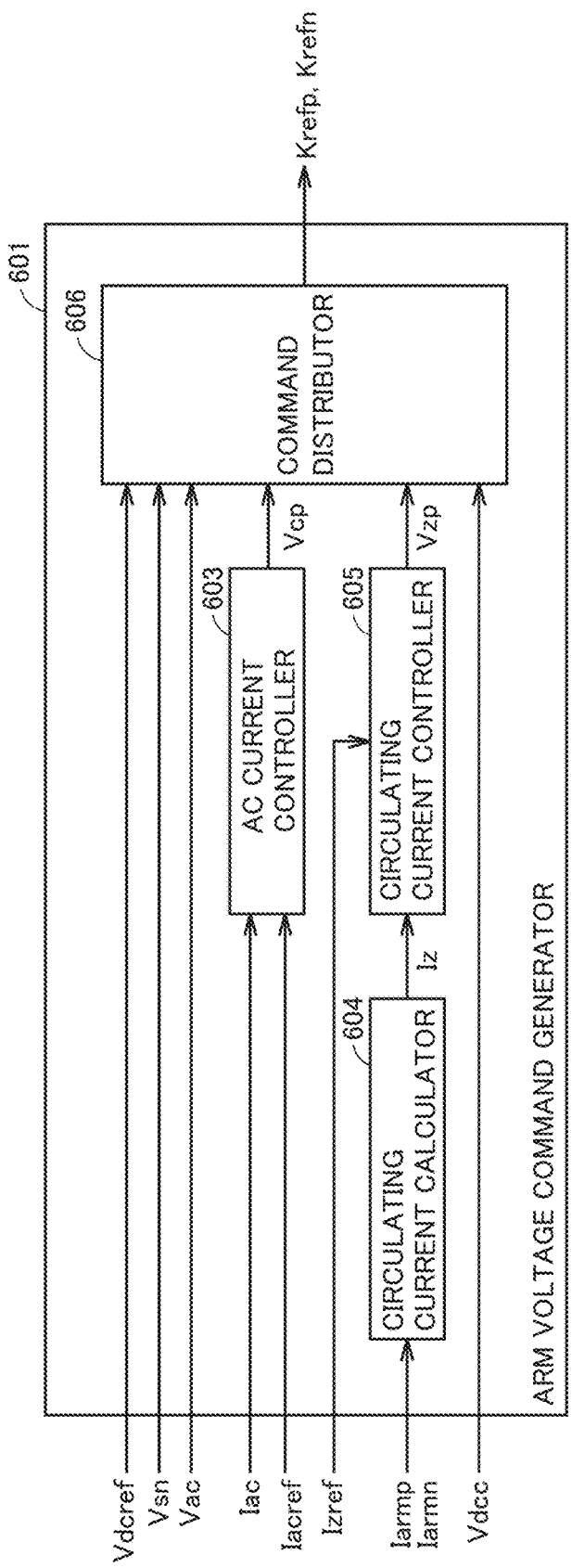
FIG. 12 is a diagram showing a configuration of an arm voltage command generator 601 in the third embodiment.

FIG. 12 is a diagram showing a configuration of arm voltage command generator 601 in the third embodiment.

Command distributor 606 receives AC control command value Vcp, circulation control command value Vzp, DC voltage command value Vdcref, neutral point voltage Vsn, and AC voltage Vac as in the first embodiment and receives DC voltage command circulating current component Vdcc.

Command distributor 606 calculates based on these inputs, voltages to be supplied by the upper arm and the lower arm as in the first embodiment. Command distributor 606 determines arm voltage command value krefp for the upper arm and arm voltage command value krefn for the lower arm by subtracting voltage lowering due to an inductance component within the upper arm and the lower arm from the calculated voltages.

Since the effective value of arm current Iarm increases according to the present embodiment, the fundamental wave that makes up the cell voltage command value is larger. Consequently, individual cell balance control is sufficiently effective and imbalance among converter cells 7 is rectified.

Fourth Embodiment

In the present embodiment, transformer 13 is defined as a transformer variable in transformation ratio. The transformer variable in transformation ratio is implemented, for example, by a transformer with a tap switching function.

Since AC output power and DC output power are determined by a higher-order command, the AC output current and the DC output current cannot freely be set.

Power conversion device 1 is interconnected to AC circuit 12 with transformer 13 being interposed. Therefore, by varying the transformation ratio of transformer 13, AC output current Vac can be varied without affecting AC output power and DC output power. Since the effective value of arm current Iarm can thus be increased, imbalance among converter cells 7 can be rectified.

Figure 13:
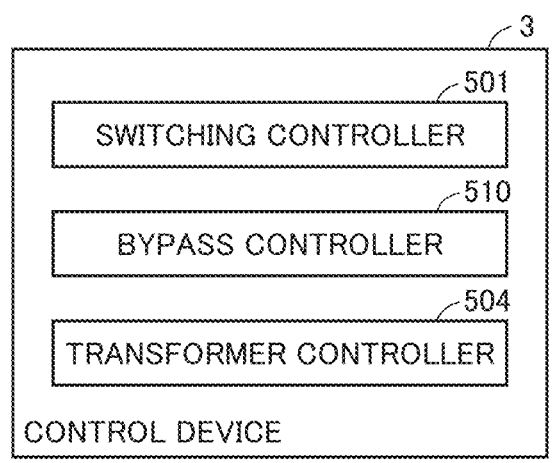
FIG. 13 is a diagram showing a configuration of control device 3 in a fourth embodiment.

FIG. 13 is a diagram showing a configuration of control device 3 in a fourth embodiment.

Control device 3 in the fourth embodiment includes switching controller 501 and bypass controller 510 as in the first embodiment and includes a transformer controller 504.

When transformer controller 504 senses failure of converter cell 7 in any of the plurality of arms, it varies the transformation ratio of transformer 13 in order to increase the effective value of arm current Iarm. Specifically, the AC current that flows from AC circuit 12 to power conversion device 1 is increased by lowering a ratio N (V2/V1) between a voltage V1 on a side of AC circuit 12 of transformer 13 and a voltage V2 on a side of power conversion device 1. Since the effective value of arm current Iarm thus increases, the fundamental wave that makes up the cell voltage command value is larger. Consequently, influence of a harmonic can be lessened.

Fifth Embodiment

Figure 14:
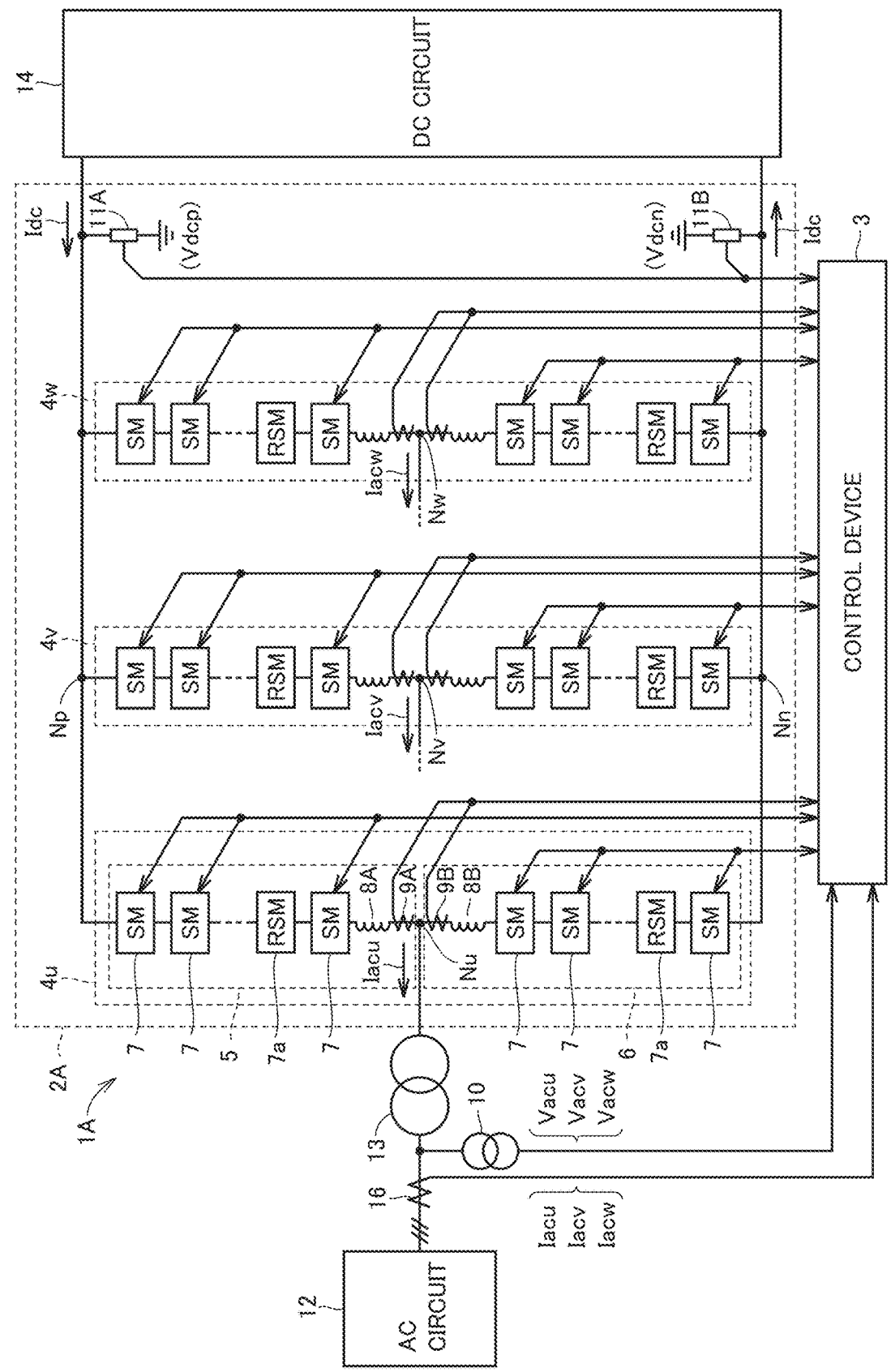
FIG. 14 is a diagram showing a configuration of a power conversion device 1A in a fifth embodiment.

FIG. 14 is a diagram showing a configuration of a power conversion device 1A in a fifth embodiment.

Power conversion device 1A in the fifth embodiment is different from power conversion device 1 in the first embodiment in that each arm in a power converter 2A of power conversion device 1A in the fifth embodiment includes a redundant converter cell (RSM) 7a. Redundant converter cell 7a is similar in configuration to converter cell 7 shown in FIGS. 2(a) and (b).

Redundant converter cell 7a in each arm is bypassed before occurrence of failure in any converter cell 7 within each arm. Therefore, during this period, redundant converter cell 7a does not perform a conversion operation.

Bypass of redundant converter cell 7a in each arm is canceled after occurrence of failure in any converter cell 7 within each arm. Therefore, during this period, redundant converter cell 7a performs the conversion operation instead of converter cell 7 that has failed.

Before any converter cell 7 within the arm fails, bypass controller 510 turns on bypass switch 34 of redundant converter cell 7a within that arm. After any converter cell 7 within the arm fails, bypass controller 510 turns off bypass switch 34 of redundant converter cell 7a within that arm.

As set forth above, in the present embodiment, after any converter cell 7 within each arm fails, redundant converter cell 7a performs the conversion operation instead of converter cell 7 that has failed. Thus, even when converter cell 7 fails, the number of converter cells that operate in one arm does not vary and a harmonic component in the output voltage from the converter cell can be canceled.

The number of redundant converter cells 7a within the arm is not limited to one but a plurality of redundant converter cells may be provided. Redundant converter cell 7a within the arm does not have to be fixed. A redundant converter cell may be selected every certain cycle, sequentially, or randomly, from among a plurality of converter cells that have not failed.

(Modification)

The present invention is not limited to the embodiments above but includes also modifications as below.

(1) Configuration of Power Converter 2

In the embodiment above, power converter 2 is in a configuration called a double star. Power converter 2 is mainly used as an AC-DC converter for high voltage direct current (HVDC) power transmission. Control of the power converter described in the embodiment above is also applicable to a power converter in another configuration.

Figure 15:
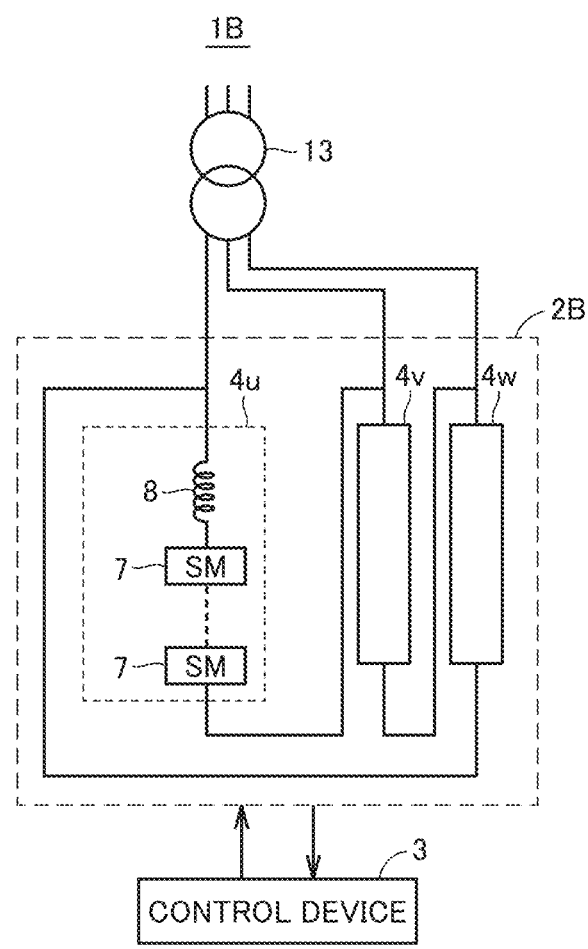
FIG. 15 is a diagram showing a configuration of a part of a power conversion device 1B.

FIG. 15 is a diagram showing a configuration of a part of a power conversion device 1B.

A power converter 2B of power conversion device 1B is in a configuration called a single delta. Power converter 2B is mainly used for a static var compensator.

Figure 16:
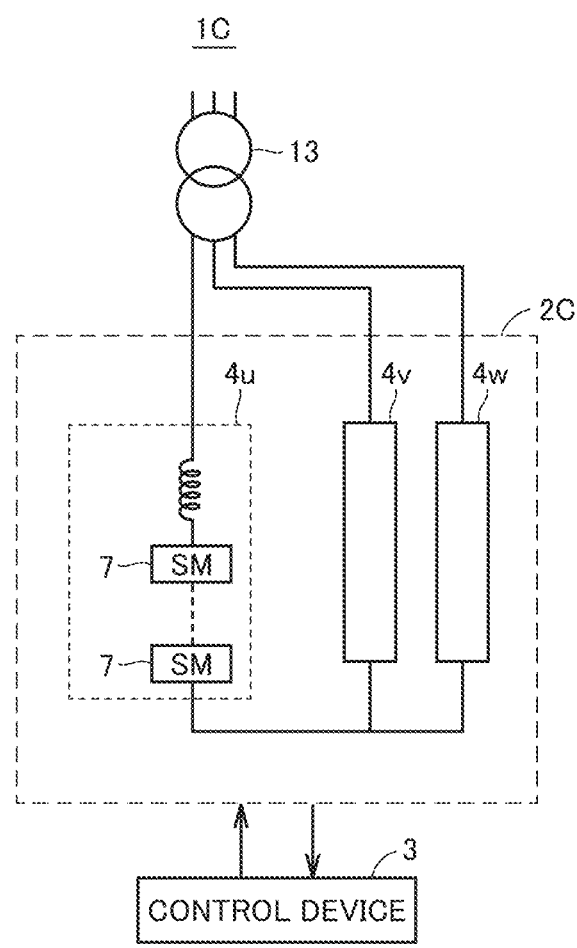
FIG. 16 is a diagram showing a configuration of a part of a power conversion device 1C.

FIG. 16 is a diagram showing a configuration of a part of a power conversion device 1C.

A power converter 2C of power conversion device 1C is in a configuration called a single star. Power converter 2C is also mainly used for a static var compensator.

A scheme for suppressing a harmonic produced due to failure of converter cell 7 as described in the embodiments above is effective also in power converters 2B and 2C. In power converter 2C including an output only on the AC side, a circulating current described in the second embodiment may be a current at a frequency other than a fundamental wave component. For example, a circulating current containing a DC component may flow.

(2) Though PWM modulation based on triangular wave comparison is described by way of example in the embodiments above, PWM modulation based on sawtooth wave comparison in which carriers are sawtooth waves may be applicable and carriers are not restricted. In a case of PWM modulation based on a space voltage vector as well, by adding a function to achieve a similar effect, a power conversion device can continue operating also in case of failure in a converter cell.

(3) Converter Cell for Circulating Current Control

When an arm includes a common converter cell and a converter cell for controlling a circulating current, the configuration of the basic controller is different from that shown in FIG. 4.

Figure 17:
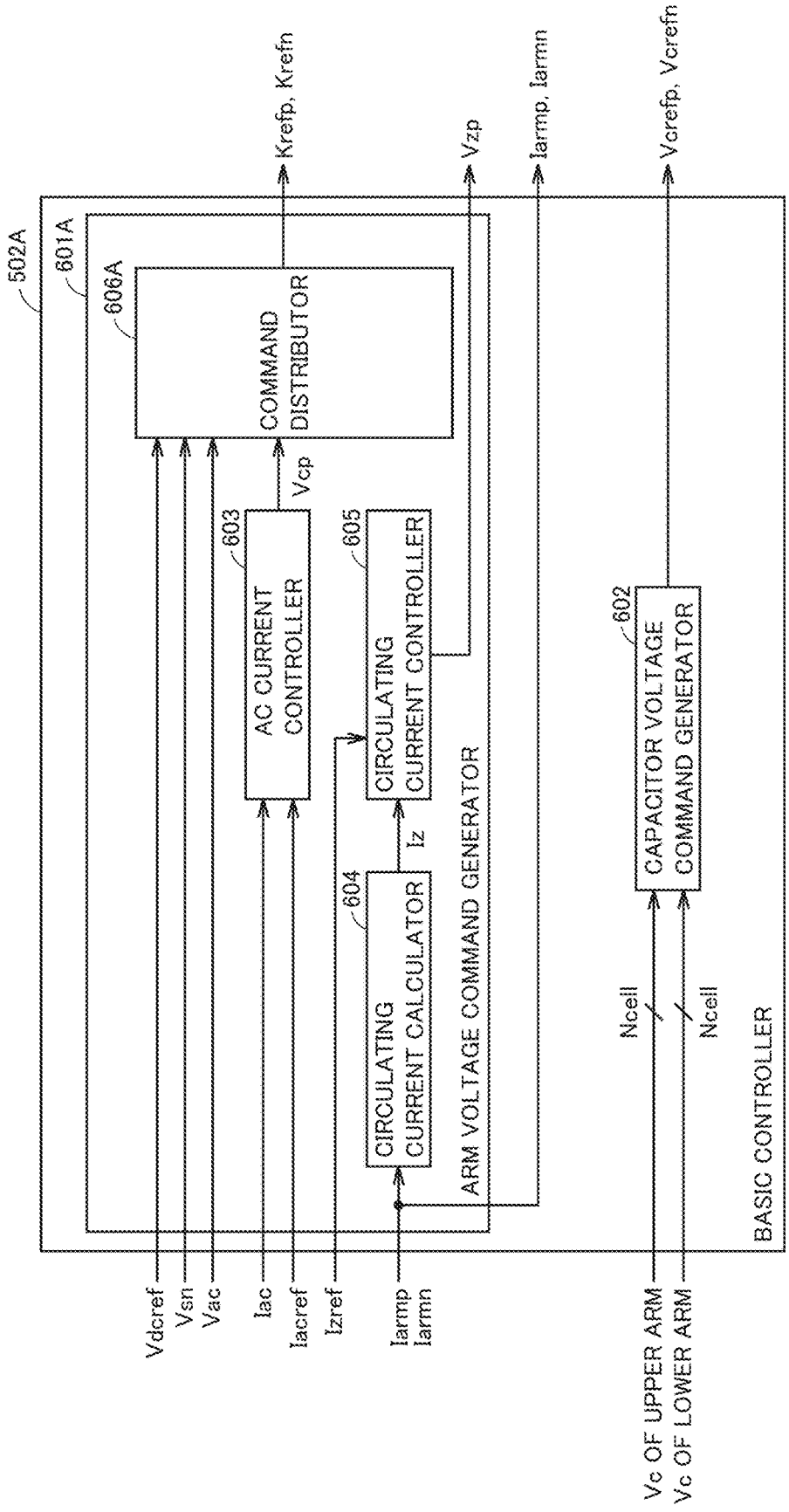
FIG. 17 is a diagram showing a configuration of a basic controller 502A in a modification.

FIG. 17 is a diagram showing a configuration of a basic controller 502A in a modification.

Basic controller 502A in FIG. 17 is different from basic controller 502 in FIG. 4 in that circulation control command value Vzp provided from basic controller 60 is not provided to a command distributor 606A.

Command distributor 606A receives AC control command value Vcp, DC voltage command value Vdcref, neutral point voltage Vsn, and AC voltage Vac. Based on these inputs, command distributor 606A calculates voltages to be supplied by the upper arm and the lower arm. Command distributor 606A determines arm voltage command value krefp for the upper arm and arm voltage command value krefn for the lower arm by subtracting voltage lowering due to an inductance component within the upper arm and the lower arm from the calculated voltages. A signal to control common converter cells within the arm is generated based on arm voltage command value krefp and arm voltage command value krefn for the lower arm, as described in the first embodiment.

A not-shown control block provides a PWM modulated signal to the converter cell for circulator control based on circulation control command value Vzp provided from basic controller 502A.

(4) Arm Voltage

Though a harmonic component in an arm current is extracted from the arm current and suppressed in the first and second embodiments, limitation thereto is not intended. A harmonic component in an arm voltage may be extracted from the arm voltage and suppressed.

(5) Neutral Zone

A neutral zone may be provided in an output from harmonic current extractor 2041 and harmonic current controller 2042 may operate only when a harmonic component contained in an arm current or a harmonic component contained in an arm voltage exceeds a threshold value.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1, 1A, 1B, 1C power conversion device; 2, 2A, 2B, 2C power converter; 3 control device; 4u, 4v, 4w leg circuit; 5u, 5v, 5w upper arm; 6u, 6v, 6w lower arm; 7 converter cell; 7a redundant converter cell; 8A, 8B reactor; 9A, 9B arm current detector; 10 AC voltage detector; 11A, 11B DC voltage detector; 12 AC circuit; 13 transformer; 14 DC circuit; 16 AC current detector; 31p, 31n, 31p1, 31n1, 31p2, 31n2 switching element; 32 power storage element; 33 voltage detector; 34 bypass switch; 202 individual cell controller; 204, 304 arm harmonic current suppression controller; 251, 2051, 716_1, 716_2, 716_3 adder; 252 multiplier; 253 divider; 501 switching controller; 502, 502A basic controller; 502U U-phase basic controller; 502V V-phase basic controller; 502W W-phase basic controller; 503UP U-phase upper arm controller; 503UN U-phase lower arm controller; 503VP V-phase upper arm controller; 503VN V-phase lower arm controller; 503WP W-phase upper arm controller; 503WN W-phase lower arm controller; 504 transformer controller; 510 bypass controller; 530 AD converter unit; 531 analog filter; 532 AD converter; 535 arithmetic processing unit; 536 CPU; 537 memory; 538, 539 bus I/F; 540 bus; 543 IO unit; 544 communication circuit; 545 digital input circuit; 546 digital output circuit; 547 settling-and-display unit; 548 touch panel; 555 optical repeater; 601, 601A arm voltage command generator; 602 capacitor voltage command generator; 603 AC current controller; 604, 711 circulating current calculator; 605 circulating current controller; 606, 606A command distributor; 610 cell balancing circulating current controller; 611, 712_1, 712_2, 712_3 first coordinate converter; 612 compensator; 613, 715_1, 715_2, 715_3 second coordinate converter; 713_1, 713_2, 713_3 d-axis filter; 714_1, 714_2, 714_3 q-axis filter; 2021 individual cell balance controller; 2022 PWM modulator; 2023, 2044, 3044 signal switch; 2032 normal cell calculator; 2039 suppression control corrector; 2041, 3041 harmonic current extractor; 2042, 3042 harmonic current controller; 2043, 3043 failed cell presence determination unit; Nn low-potential-side DC terminal; Np high-potential-side DC terminal; Nu, Nv, Nw AC input terminal

The invention claimed is:

1. A power conversion device comprising:
a power converter including an arm in which a plurality of converter cells are connected in series, each of the plurality of converter cells including at least two switching elements, a power storage element, and a pair of output terminals; and
a control device to control the power converter,
the converter cell including a switch to have the converter cell bypassed, wherein
when the control device senses failure of a converter cell, the control device has a failed converter cell within the arm bypassed and controls a normal converter cell within the arm to suppress a ratio of a harmonic component in an arm current that increases due to the failure,
the control device controls the normal converter cell within the arm based on a harmonic suppression control output value for suppressing the harmonic component in the arm current that increases due to the failure.

2. The power conversion device according to claim 1, wherein
the control device corrects an arm voltage command value based on the harmonic suppression control output value.

3. The power conversion device according to claim 2, wherein
the control device includes
a basic controller to provide the arm voltage command value,
an adder to add the harmonic suppression control output value and the arm voltage command value,
a divider to divide the number of converter cells within the arm by the number of normal converter cells within the arm, and
a multiplier to multiply an output from the adder by an output from the divider.

4. The power conversion device according to claim 3, wherein
the control device further includes a plurality of individual cell controllers, each individual cell controller individually controlling a corresponding converter cell within the arm upon receiving the output from the multiplier, and
the individual cell controller corresponding to the normal converter cell calculates a voltage command value for the corresponding converter cell based on the output from the multiplier.

5. The power conversion device according to claim 1, wherein
the control device calculates a harmonic suppression control output for each arm for suppressing the harmonic component in the arm current of each arm that increases due to the failure, based on the arm current of each arm within the power converter.

6. The power conversion device according to claim 1, wherein
the control device calculates a harmonic suppression control output of each phase for suppressing the harmonic component in the arm current of all arms that increases due to the failure, based on the arm current of all arms within the power converter.

7. The power conversion device according to claim 1, wherein
when the control device senses failure of a converter cell, the control device increases an effective value of the arm current that flows through the arm.

8. The power conversion device according to claim 7, wherein
the control device has a current circulated within the power converter for increasing the effective value of the arm current, the current containing a frequency component different from a frequency component of a current provided from the power converter.

9. The power conversion device according to claim 7, comprising a transformer variable in transformation ratio, wherein
the control device increases an AC output current by varying the transformation ratio for increasing the effective value of the arm current.

* * * * *